US012075831B2

(12) United States Patent
Yoon et al.

(10) Patent No.: US 12,075,831 B2
(45) Date of Patent: Sep. 3, 2024

(54) AEROSOL GENERATING DEVICE INCLUDING HEATING ELEMENT AND AEROSOL GENERATING SYSTEM

(71) Applicant: KT&G CORPORATION, Daejeon (KR)

(72) Inventors: Sung Wook Yoon, Gyeonggi-do (KR); Yong Hwan Kim, Gyeonggi-do (KR); Seung Won Lee, Gyeonggi-do (KR); Dae Nam Han, Seoul (KR)

(73) Assignee: KT & G CORPORATION, Daejeon (KR)

( * ) Notice: Subject to any disclaimer, the term of this patent is extended or adjusted under 35 U.S.C. 154(b) by 739 days.

(21) Appl. No.: 17/268,295

(22) PCT Filed: Nov. 10, 2020

(86) PCT No.: PCT/KR2020/015707

§ 371 (c)(1),
(2) Date: Feb. 12, 2021

(87) PCT Pub. No.: WO2021/125561

PCT Pub. Date: Jun. 24, 2021

(65) Prior Publication Data

US 2022/0338540 A1 Oct. 27, 2022

(30) Foreign Application Priority Data

Dec. 19, 2019 (KR) ........................ 10-2019-0170926
Jun. 4, 2020 (KR) ........................ 10-2020-0067865

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/40* (2020.01); *A24F 40/50* (2020.01);
(Continued)

(58) Field of Classification Search
CPC .......... A24F 40/46; A24F 40/10; A24F 40/40; A24F 40/50; A24F 40/70; A24F 40/20;
(Continued)

(56) References Cited

U.S. PATENT DOCUMENTS 9,516,899 B2 12/2016 Plojoux et al.
11,382,358 B2 * 7/2022 Batista .................. A24F 40/465
(Continued)

FOREIGN PATENT DOCUMENTS

CN 107801375 A 3/2018
EP 3 069 620 A 9/2016
(Continued)

OTHER PUBLICATIONS

International Search Report dated Feb. 16, 2021 from the International Searching Authority in International Application No. PCT/KR2020/015707.
(Continued)

*Primary Examiner* — Justin M Kratt
(74) *Attorney, Agent, or Firm* — Sughrue Mion, PLLC

(57) ABSTRACT

An aerosol generating device includes a heating element of which inner surface have different portions having different structures such that the portions of the heating element may heat corresponding areas of an aerosol generating article which is inserted in the aerosol generating device at different temperatures, thereby providing a good quality of aerosol to the user.

14 Claims, 9 Drawing Sheets

(51) Int. Cl.

| | |
|---|---|
| ***A24F 40/40*** | (2020.01) |
| ***A24F 40/50*** | (2020.01) |
| ***A24F 40/70*** | (2020.01) |
| *A24D 1/20* | (2020.01) |
| *A24F 40/20* | (2020.01) |
| *A24F 40/30* | (2020.01) |
| *A24F 40/465* | (2020.01) |
| *A24F 40/51* | (2020.01) |
| *H05B 3/42* | (2006.01) |
| *H05B 3/44* | (2006.01) |
| *H05B 3/46* | (2006.01) |

(52) U.S. Cl.

CPC ................ *A24F 40/70* (2020.01); *A24D 1/20* (2020.01); *A24F 40/20* (2020.01); *A24F 40/30* (2020.01); *A24F 40/465* (2020.01); *A24F 40/51* (2020.01); *H05B 3/42* (2013.01); *H05B 3/44* (2013.01); *H05B 3/46* (2013.01); *H05B 2203/017* (2013.01); *H05B 2203/021* (2013.01); *H05B 2203/037* (2013.01)

(58) Field of Classification Search

CPC ........ A24F 40/30; A24F 40/465; A24F 40/51; A24D 1/20; H05B 3/42; H05B 3/44; H05B 3/46; H05B 2203/017; H05B 2203/021; H05B 2203/037

See application file for complete search history.

(56) References Cited

U.S. PATENT DOCUMENTS

| | | | | |
|---|---|---|---|---|
| 2014/0305449 | A1 | 10/2014 | Plojoux et al. | |
| 2016/0143355 | A1 | 5/2016 | Borges et al. | |
| 2017/0273353 | A1 | 9/2017 | Gindrat | |
| 2018/0271153 | A1 | 9/2018 | John et al. | |
| 2018/0271171 | A1 | 9/2018 | Abramov et al. | |
| 2019/0098930 | A1* | 4/2019 | Fallon | A24F 40/42 |
| 2019/0191769 | A1 | 6/2019 | Qiu | |
| 2020/0260787 | A1 | 8/2020 | Zinovik et al. | |
| 2020/0359688 | A1 | 11/2020 | Jang et al. | |
| 2021/0360970 | A1* | 11/2021 | Takeuchi | A24F 40/20 |
| 2022/0295887 | A1* | 9/2022 | Rogan | A24F 40/48 |

FOREIGN PATENT DOCUMENTS

| | | | |
|---|---|---|---|
| JP | 6-29084 | U | 4/1994 |
| JP | 2014-216287 | A | 11/2014 |
| JP | 2019-513349 | A | 5/2019 |
| KR | 10-2014-0116055 | A | 10/2014 |
| KR | 10-2018-0071429 | A | 6/2018 |
| KR | 10-2019-0035996 | A | 4/2019 |
| KR | 10-2019-0093027 | A | 8/2019 |
| WO | 2018/041065 | A1 | 3/2018 |
| WO | 2019/030000 | A1 | 2/2019 |
| WO | 2019238819 | A1 | 12/2019 |

OTHER PUBLICATIONS

Extended European Search Report dated Aug. 9, 2021 by the European Patent Office in application No. 20855820.5.

Office Action dated May 9, 2022 issued by the Korean Patent Office in Korean Application No. 10-2020-0067865.

Office Action dated Sep. 11, 2023 in Chinese Application No. 202080006827.7.

* cited by examiner

AEROSOL GENERATING DEVICE INCLUDING HEATING ELEMENT AND AEROSOL GENERATING SYSTEM

CROSS REFERENCE TO RELATED APPLICATIONS

This application is a National Stage of International Application No. PCT/KR2020/015707 filed Nov. 10, 2020, claiming priority based on Korean Patent Application No. 10-2019-0170926 filed Dec. 19, 2019 and Korean Patent Application No. 10-2020-0067865 filed Jun. 4, 2020.

TECHNICAL FIELD

One or more embodiments relate to an aerosol generating device including a heating element, and an aerosol generating system.

BACKGROUND ART

Recently, the demand for an alternative to a traditional cigarette has increased. For example, there is growing demand for a general aerosol generating article that generates aerosol by heating an aerosol generating material in the aerosol generating article (i.e., cigarette), rather than by combusting the aerosol generating article. Accordingly, studies on a heating-type aerosol generating article or a heating-type aerosol generating device have been actively conducted.

DISCLOSURE OF INVENTION

Technical Problem

Recently, a method of heating an aerosol generating article by using an aerosol generating device has been studied. In particular, there is a need to heat a plurality of areas of an aerosol generating article at different temperatures to improve the quality and taste of an aerosol. However, it is difficult to implement such features due to structural complexity of a device, an increase in manufacturing costs, and the like.

The technical problems are not limited to those described above, and other technical problems may be inferred from the following examples.

Advantageous Effects of Invention

According to one or more embodiments, an aerosol generating device may heat respective portions of an aerosol generating article at different temperatures. Therefore, a smoker may be provided with a better smoking sensation by the aerosol generating article.

The effects of the present disclosure are not limited to those described above and may include all effects that may be inferred from a configuration that will be described later.

BEST MODE FOR CARRYING OUT THE INVENTION

Figure 1:
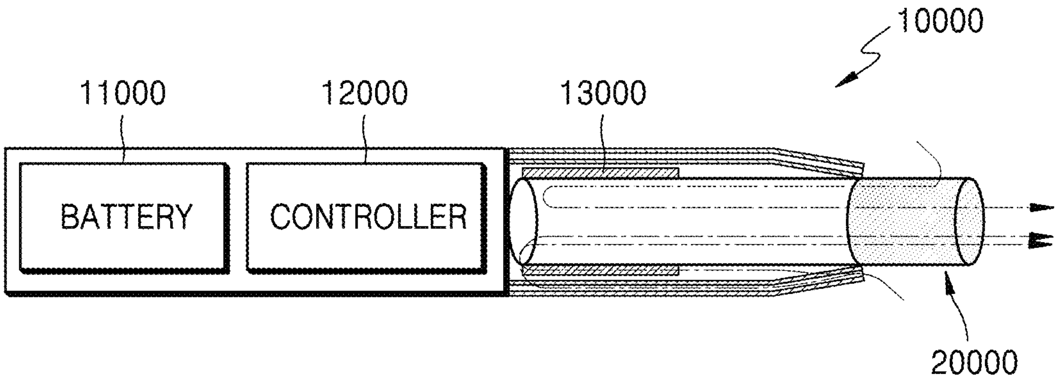
FIG. 1 is a view illustrating an example in which an aerosol generating article is inserted into an aerosol generating device, according to an embodiment.

According to one or more embodiments, an aerosol generating device includes: a housing having an open end; a battery arranged at another end of the housing and configured to supply power; an accommodation space arranged at the open end of the housing and configured to accommodate an aerosol generating article; and a heating element configured to heat the aerosol generating article and including a first portion and a second portion continuously arranged in a longitudinal direction of the aerosol generating article, wherein the first portion and the second portion have different surface structures.

The heating element may have a cylindrical shape and may be arranged to surround the accommodation space such that the first portion and the second portion are continuously arranged in a longitudinal direction of the heating element.

The heating element may have an elongated shape and may be arranged inside the accommodation space such that the first portion and the second portion are continuously arranged in a longitudinal direction of the elongated shape.

At least one of the first portion and the second portion of the heating element may have an inner surface including a plurality of grooves or a plurality of protrusions.

The grooves may have a depth of about 0.1 μm to about 100 μm, and the protrusions may have a height of about 0.1 μm to about 100 μm.

The inner surface may include an oxide layer having a thickness of about 1 μm to about 10 μm.

The plurality of grooves or the plurality of protrusions may be regularly arranged.

One of the first portion and the second portion may have higher heat conductivity than the other.

According to one or more embodiments, an aerosol generating system includes: an aerosol generating device; and an aerosol generating article including a first area including an aerosol generating material and a second area including a tobacco material, wherein the first portion heats the first area, and the second portion heats the second area.

The first area may be heated at about 200° C. to about 300° C., and the second area may be heated at about 100° C. to about 180° C.

According to one or more embodiments, a method of processing a heating element for an aerosol generating device includes: preparing the heating element having a cylindrical shape; dividing the heating element into a first portion and a second portion that are continuously arranged in a longitudinal direction of the cylindrical shape; and processing an inner surface of at least one of the first portion and the second portion such that inner surfaces of the first portion and the second portion have different structures.

The processing of the inner surface may include forming a plurality of grooves by oxidizing the inner surface.

The processing of the inner surface may include forming a plurality of protrusions by depositing particles on the inner surface.

According to one or more embodiments, an aerosol generating device includes: a housing having an open end; a battery arranged at the other end of the housing and configured to supply power; an accommodation space arranged at the open end of the housing and configured to accommodate an aerosol generating article; and a heating element configured to heat the aerosol generating article and including a first portion and a second portion continuously arranged in a longitudinal direction of the aerosol generating article, wherein the first portion and the second portion have different surface areas.

The first portion and the second portion may have the same thermal mass.

The first portion may have grooves, and the second portion may have protrusions.

At least one of the first portion and the second portion may be embossed, and the other of the first portion and the second portion may be engraved.

At least one of the first portion and the second portion may have a streamlined flexure.

The aerosol generating article may include a first area corresponding to the first portion; and a second area corresponding to the second portion, wherein an amount of heat transferred by the first portion to the first area is different from an amount of heat transferred by the second portion to the second area.

The aerosol generating article may include a first area corresponding to the first portion; and a second area corresponding to the second portion, wherein an amount of heat transferred by the first portion to the first area is greater than an amount of heat transferred by the second portion to the second area.

The technical problems to be solved are not limited to those described above and may include all matters which may be inferred throughout by one of ordinary skill in the art.

MODE FOR THE INVENTION

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

As used herein, "a longitudinal direction of an aerosol generating article" refers to a lengthwise direction of the aerosol generating article or a direction in which the aerosol generating article is inserted into an aerosol generating device.

In addition, "a longitudinal direction of a heating element" refers to a lengthwise direction of the heating element. In the case of an external heating-type heating element, it may also refer to a direction in which an aerosol generating article is inserted into the external heating-type heating element.

Hereinafter, embodiments of the present disclosure will be described in detail with reference to the accompanying drawings.

FIG. 1 is a view illustrating an example in which an aerosol generating article 20000 is inserted into an aerosol generating device 10000, according to an embodiment.

Referring to FIG. 1, the aerosol generating device 10000 may include a battery 11000, a controller 12000, and a heater 13000.

Figure 2:
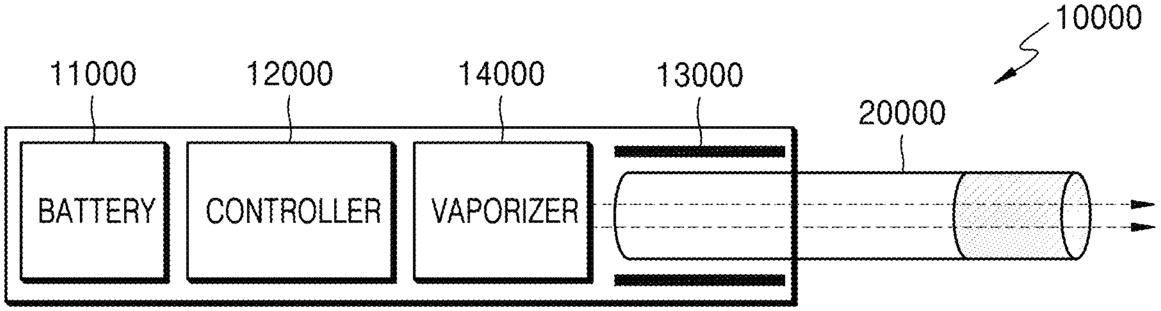
FIG. 2 is a view illustrating an example in which an aerosol generating article is inserted into an aerosol generating device, according to another embodiment.
Figure 3:
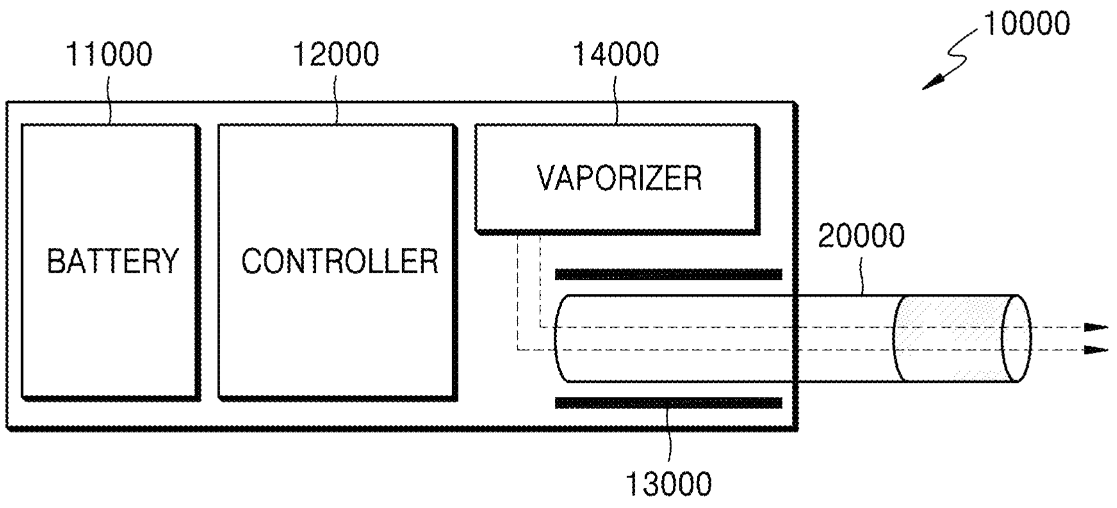
FIG. 3 is a view illustrating an example in which an aerosol generating article is inserted into an aerosol generating device, according to another embodiment.

FIG. 2 is a view illustrating an example in which an aerosol generating article 20000 is inserted into an aerosol generating device 10000, according to another embodiment. FIG. 3 is a view illustrating an example in which an aerosol generating article 20000 is inserted into an aerosol generating device 10000, according to another embodiment.

Referring to FIGS. 2 and 3, the aerosol generating device 10000 further includes a vaporizer 14000. Also, the aerosol generating article 20000 may be inserted into an inner space of the aerosol generating device 10000.

Components of the aerosol generating device 10000 illustrated in FIGS. 1 through 3 are only an example. Therefore, it will be understood by one of ordinary skill in the art associated with the present embodiment that other general-purpose components may be further included in the aerosol generating device 10000, in addition the components illustrated in FIGS. 1 through 3.

In addition, FIGS. 2 and 3 illustrate that the heater 13000 is included in the aerosol generating device 10000. However, as needed, the heater 13000 may be omitted.

FIG. 1 illustrates that the battery 11000, the controller 12000, and the heater 13000 are arranged in a line. Also, FIG. 2 illustrates that the battery 11000, the controller 12000, the vaporizer 14000, and the heater 13000 are arranged in a line. In addition, FIG. 3 illustrates that the vaporizer 14000 and the heater 13000 are arranged in parallel. However, the internal structure of the aerosol generating device 10000 is not limited to those illustrated in FIGS. 1 through 3. In other words, according to the design of the aerosol generating device 10000, the arrangement of the battery 11000, the controller 12000, the heater 13000, and the vaporizer 14000 may be changed.

When the aerosol generating article 20000 is inserted into the aerosol generating device 10000, the aerosol generating device 10000 may operate the heater 13000 and/or the vaporizer 14000 to generate aerosol from the aerosol generating article 20000 and/or the vaporizer 14000. The aerosol generated by the heater 13000 and/or the vaporizer 14000 passes through the aerosol generating article 20000 and is delivered to a user.

As needed, even if the aerosol generating article 20000 is not inserted into the aerosol generating device 10000, the aerosol generating device 10000 may heat the heater 13000.

The battery 11000 supplies power used to operate the aerosol generating device 10000. For example, the battery 11000 may supply power to heat the heater 13000 or the vaporizer 14000 and may supply power for operating the controller 12000. Also, the battery 11000 may supply power for operating a display, a sensor, a motor, and the like installed in the aerosol generating device 10000.

The controller 12000 generally controls operation of the aerosol generating device 10000. In detail, the controller 12000 controls not only operations of the battery 11000, the heater 13000, and the vaporizer 14000, but also operations of other components included in the aerosol generating device 10000. In addition, the controller 12000 may identify a state of each of the components of the aerosol generating device 10000 to determine whether or not the aerosol generating device 10000 is in an operable state.

The controller 12000 may include at least one processor. A processor may be implemented as an array of a plurality of logic gates or as a combination of a general purpose microprocessor and a memory in which a program executable in the microprocessor is stored. It will be understood by one of ordinary skill in the art that the processor can be implemented in other forms of hardware.

The heater 13000 may be heated by power supplied from the battery 11000. For example, when the aerosol generating article 20000 is inserted into the aerosol generating device 10000, the heater 13000 may be located outside the aerosol generating article 20000. Therefore, the heated heater 13000 may increase a temperature of an aerosol generating material in the aerosol generating article 20000.

The heater 13000 may include an electro-resistive heater. For example, the heater 13000 may include an electrically conductive track, and the heater 13000 may be heated when currents flow through the electrically conductive track. However, the heater 13000 is not limited to the example described above, and any other heaters capable of being heated to a desired temperature may be used. Here, the desired temperature may be pre-set in the aerosol generating device 10000 or may be set manually by a user.

As another example, the heater 13000 may include an induction heater. In detail, the heater 13000 may include an electrically conductive coil for heating the aerosol generating article 20000 by an induction heating method, and the aerosol generating device 10000 or the aerosol generating article 20000 may include a susceptor that may be heated by the electrically conductive coil.

Examples of the heater 13000 may include, but are not limited to, a tube-type heating element, a plate-type heating element, a needle-type heating element, and a rod-type heating element. The heater 13000 may heat the inside or the outside of the aerosol generating article 20000, according to the shape of the heating element.

Also, the aerosol generating device 10000 may include a plurality of heaters 13000. Here, the plurality of heaters 13000 may be inserted into the aerosol generating article 20000 or may be arranged outside the aerosol generating article 20000. Also, some of the plurality of heaters 13000 may be inserted into the aerosol generating article 20000 and the others may be arranged outside the aerosol generating article 20000. In addition, the shape of the heater 13000 is not limited to the shapes illustrated in FIGS. 1 through 3 and may include various shapes.

The vaporizer 14000 may generate an aerosol by heating a liquid composition and the generated aerosol may pass through the aerosol generating article 20000 to be delivered to a user. In other words, the aerosol generated via the vaporizer 14000 may move along an air flow passage of the aerosol generating device 10000, and the air flow passage may be configured such that the aerosol generated via the vaporizer 14000 passes through the aerosol generating article 20000 to be delivered to the user.

For example, the vaporizer 14000 may include a liquid storage, a liquid delivery element, and a heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14000, or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heater 13000 is an element for heating the liquid composition delivered by the liquid delivery element. For example, the heater 13000 may include a metal heating wire, a metal heating plate, a ceramic heater, or the like but is not limited thereto. Also, the heater 13000 may include a conductive filament such as nichrome wire and may be located as being wound around the liquid delivery element. The heater 13000 may be heated by a current supply and may transfer heat to the liquid composition in contact with the heater 13000, thereby heating the liquid composition. As a result, aerosol may be generated.

For example, the vaporizer 14000 may be referred to as a cartomizer or an atomizer, but it is not limited thereto.

The aerosol generating device 10000 may further include general-purpose components in addition to the battery 11000, the controller 12000, the heater 13000, and the vaporizer 14000. For example, the aerosol generating device 10000 may include a display capable of outputting visual information and/or a motor for outputting haptic information. Also, the aerosol generating device 10000 may include at least one sensor (e.g., a puff detecting sensor, a temperature detecting sensor, a cigarette insertion detecting sensor, etc.). Also, the aerosol generating device 10000 may be formed as a structure where, even when the aerosol generating article 20000 is inserted into the aerosol generating device 10000, external air may be introduced or internal air may be discharged.

Although not illustrated in FIGS. 1 through 3, the aerosol generating device 10000 and an additional cradle may form together a system. For example, the cradle may be used to charge the battery 11000 of the aerosol generating device 10000. Alternatively, the heater 13000 may be heated when the cradle and the aerosol generating device 10000 are coupled to each other.

At least a portion of a first area of the aerosol generating article 20000 may be inserted into the aerosol generating device 10000, and a second area and a third area of the aerosol generating article 20000 may be exposed to the outside. Also, the first area or at least a portion of the second area of the aerosol generating article 20000 may be inserted into the aerosol generating device 10000. The user may inhale aerosol while holding the third area by the mouth of the user. Here, aerosol may be generated as external air passes through the first area, and the generated aerosol may be delivered to the mouth of the user by passing through the second area and the third area.

The external air may flow into at least one air passage formed in the aerosol generating device 10000. For example, the opening and closing and/or a size of the air passage formed in the aerosol generating device 10000 may be controlled by the user. Accordingly, the amount of smoke and a smoking impression may be adjusted by the user. As another example, the external air may flow into the aerosol generating article 20000 through at least one hole formed in a surface of the aerosol generating article 20000.

Figure 4:
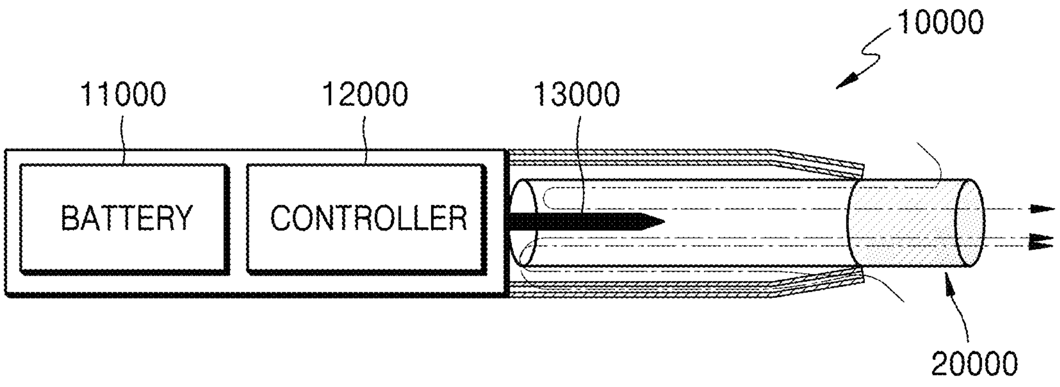
FIG. 4 is a view illustrating an example in which an aerosol generating article is inserted into an aerosol generating device, according to another embodiment.

FIG. 4 is a view illustrating an example in which an aerosol generating article 20000 is inserted into an aerosol generating device 10000, according to another embodiment.

The descriptions provided above with reference to FIGS. 1 through 3 may be analogously applied to the embodiment illustrated in FIG. 4. However, in the case of the embodiment of FIG. 4, the aerosol generating device 10000 may include a needle shaped heater 13000 such that the heater 13000 may be inserted into the aerosol generating article 20000.

Figure 5:
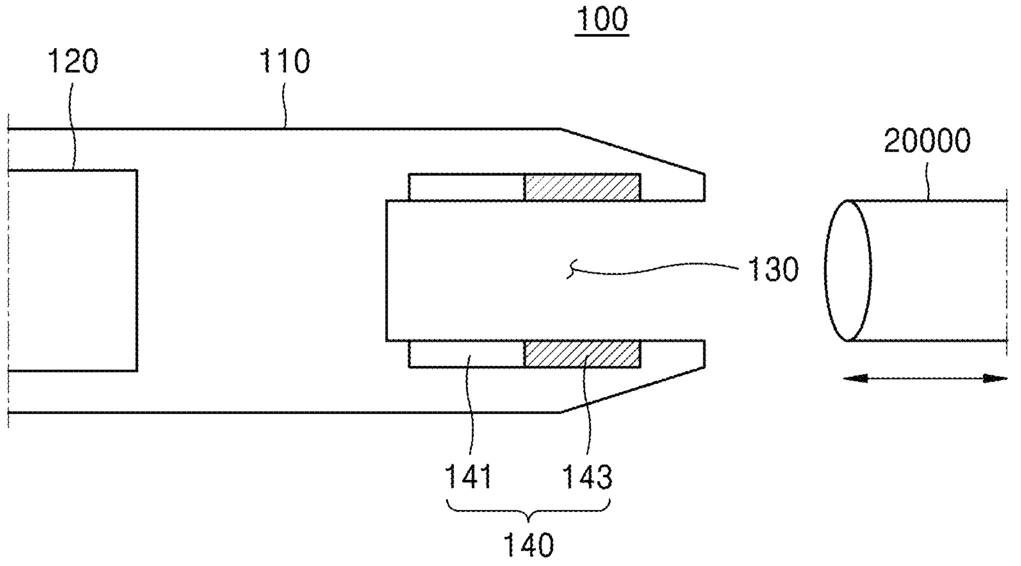
FIG. 5 is a view illustrating a simplified configuration of an aerosol generating device according to an embodiment.

FIG. 5 is a view illustrating a simplified configuration of an aerosol generating device 100 according to an embodiment.

The aerosol generating device 100 may include: a housing 110 having an open end; a battery 120 arranged at the other end of the housing 110 and supplying power to the aerosol generating device 100; an accommodation space 130 accommodating the aerosol generating article 20000; and a heating element 140 heating the aerosol generating article 20000.

The housing 110 may form an external appearance of the aerosol generating device 100. The housing 110 may include components such as a battery 120, a controller, a heating element 140 (i.e., a heater), a vaporizer 14000, or the like as described above. The housing 110 may be formed of a metal material or a plastic material. However, the material of the housing 110 is not limited thereto and may include any materials capable of firmly maintaining the external appearance of the housing 110.

The housing 110 may have the open end. The accommodation space 130 that accommodates the aerosol generating article 20000 may be arranged at the open end of the housing 110. A direction in which the aerosol generating article 20000 is inserted into the accommodation space 130 may be the same as a lengthwise direction of the aerosol generating article 20000.

The battery 120 may be arranged at the other end of the housing 110. The battery 120 may store power and then supply power to operate the aerosol generating device 100. In detail, the battery 120 may supply power to the heating element 140 that will be described later. Although not illustrated in FIG. 5, power stored in the battery 120 may be transferred to the heating element 140 through an electrical wire (not shown) or an electrode (not shown).

The accommodation space 130 may accommodate the aerosol generating article 20000. The accommodation space 130 may be divided into a first chamber and a second chamber. The first chamber may be surrounded by a first portion 141 of the heating element 140, and the second chamber may be surrounded by a second portion 143 of the heating element 140. In an example, when the aerosol generating device 100 operates, temperature ranges in which the first chamber and the second chamber are heated may be different from each other.

In one or more embodiments, the heating element 140 may include the first portion 141 and the second portion 143 that are continuously arranged in a longitudinal direction of the aerosol generating article 20000. The first portion 141 and the second portion 143 may be physically connected to each other. The first portion 141 and the second portion 143 may be arranged in series to surround the accommodation space 130 while being physically connected to each other. As a detailed example, the second portion 143 may be processed while being physically connected to the first portion 141. Therefore, the first portion 141 and the second portion 143 may have different surface structures.

In one or more embodiments, when the aerosol generating article 20000 is inserted into the aerosol generating device 100, at least a portion of the aerosol generating article 20000 may be heated. This is because the first portion 141 and the second portion 143 of the heating element 140 are arranged to surround the aerosol generating article 20000. Because the surface structures of the first portion 141 and the second portion 143 are different from each other, an area of the aerosol generating article 20000 surrounded by the first portion 141 and an area of the aerosol generating article 20000 surrounded by the second portion 143 may be heated at different temperatures. For example, the area of the aerosol generating article 20000 surrounded by the first portion 141 may be heated at a temperature of about 200° C. to about 300° C., and the area of the aerosol generating article 20000 surrounded by the second portion 143 may be heated at a temperature of about 100° C. to about 180°. Therefore, a smoker may be provided with a better smoking sensation from the aerosol generating article 20000.

The surface structures of the first portion 141 and the second portion 143 included in the heating element 140 will be described in detail below with reference to FIGS. 6 through 8.

Figure 6:
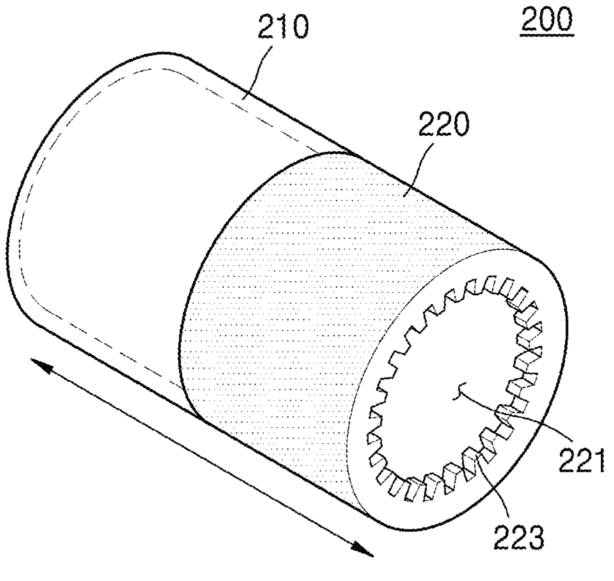
FIG. 6 is a view illustrating a heating element of an aerosol generating device, according to an embodiment.

FIG. 6 is a view illustrating a heating element 200 of an aerosol generating device according to an embodiment.

In one or more embodiments, the heating element 200 may have a cylindrical shape arranged to surround an accommodation space 221. The heating element 200 may include a first portion 210 and a second portion 220 continuously arranged in a longitudinal direction of the heating element 200 having the cylindrical shape. As described above, the first portion 210 and the second portion 220 may be physically connected to each other.

The first portion 210 may have a cylindrical shape. According to an embodiment, processing may not be performed on an inner surface and an outer surface of the first portion 210, and the first portion 210 may have a smooth inner surface structure or a smooth outer surface structure. For example, when the heating element 200 is supplied with power and resistively heated or when an electromagnetic field is applied to heat the heating element 200 by induction heating, the first portion 210 may transfer heat to the accommodation space 221 through the inner surface thereof. When an aerosol generating article is inserted into the accommodation space 221 and heated, an aerosol may be generated.

The second portion 220 may have a cylindrical shape. For example, the second portion 220 may have a shape similar to that of the first portion 210, but an inner surface structure of the second portion 220 may be transformed due to separate postprocessing, unlike the first portion 210.

Referring to FIG. 6, the second portion 220 may have an inner surface including a plurality of grooves or a plurality of protrusions 223. The inner surface of the second portion 220 may be processed, for example, by an anodizing method, a forging processing method, a die casting method, or a vacuum evaporation method. After going through one or more of the above-mentioned processing methods, the inner surface structure of the second portion 220 may be different from the inner surface structure of the first portion 210.

Figure 7A:
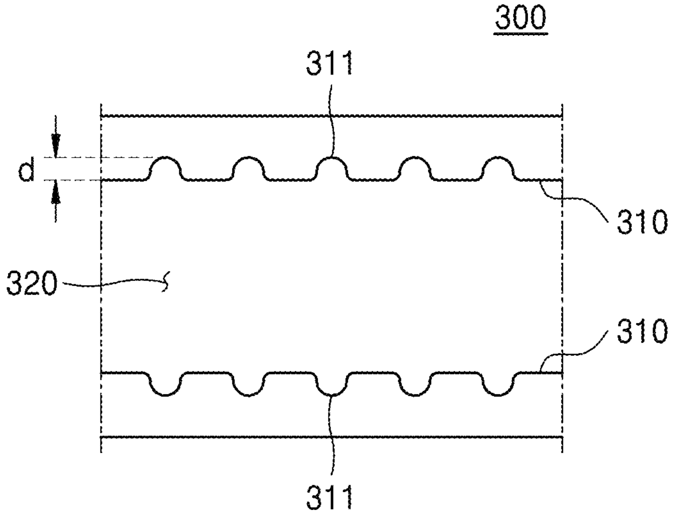
FIG. 7A is a view illustrating an inner surface of a second portion of a heating element, according to an embodiment.

FIG. 7A is a cross sectional view of a second portion 300 of a heating element, according to an embodiment.

FIG. 7A illustrates the second portion 300 as an example, but a first portion may also be processed to have a surface like that of the second portion 300.

The second portion 300 may be processed, for example, by an anodizing method. According to the anodizing method, the inner surface 310 of the second portion 300 may be oxidized. As a detailed example, when the second portion 300 is formed of a metal material before being processed, the second portion 300 may be transformed in a metal oxide material after anodizing. Examples of a metal material may include, but are not limited to, aluminum (Al), iron (Fe), chrome (Cr), nickel (Ni), cobalt (Co), stainless steel, copper (Cu), and a combination thereof. Therefore, the second portion 300 may include oxides of the aforementioned metals.

In one or more embodiments, the second portion 300 may have the inner surface 310 including a plurality of grooves 311 that are spaced apart from each other. The plurality of grooves 311 may be regularly arranged. However, the plurality of grooves 311 are not limited thereto and may be spaced apart from each other at irregular distances. Also, the inner surface 310 may include an oxide layer having a thickness of about 1 μm to about 10 μm.

The groove 311 may be formed to have a depth d of about 0.1 μm to about 100 μm from the inner surface 310. While the first portion has a smooth inner surface structure, the second portion 300 includes the plurality of grooves 311. Therefore, an amount of heat transferred from the second portion 300 to the accommodation space 310 may be less than an amount of heat transferred from the first portion to the accommodation space 320.

Figure 7B:
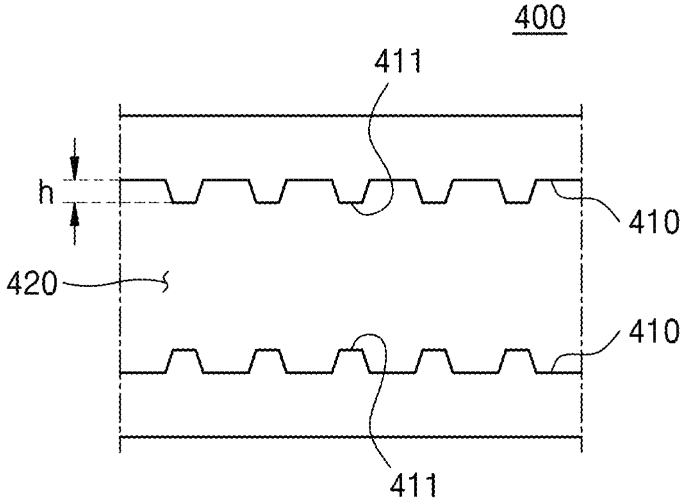
FIG. 7B is a view illustrating an inner surface of a second portion of a heating element, according to another embodiment.

FIG. 7B illustrates a cross sectional view of a second portion 400 of a heating element, according to another embodiment. In one or more embodiments, at least one of a first portion and a second portion of a heating element may have an inner surface including a plurality of grooves or a plurality of protrusions that are spaced apart from each other.

Referring to FIG. 7B, the second portion 400 of the heating element may have the inner surface 410 including a plurality of protrusions 411 that are spaced apart from each other. The plurality of protrusions 411 may be regularly arranged. However, the plurality of protrusions 411 are not limited thereto and may be spaced apart from each other at irregular distances.

The protrusion 411 may have a height h of about 0.1 μm to about 100 μm from the inner surface 410. While the first portion have a smooth inner surface, the second portion 400 includes the plurality of protrusions. Therefore, an amount of heat transferred from the second portion 400 to an accommodation space 420 may be less than an amount of heat transferred from the first portion to the accommodation space 420. Also, when an aerosol generating article is inserted into the heating element, the protrusion 411 may physically maintain the aerosol generating article inside the accommodation space 420.

In the case of the embodiment illustrated in FIG. 7B, the second portion 400 may be processed and manufactured by a forging processing method, a die casting method, or a vacuum evaporation method.

The aforementioned processing methods will be described in detail later with reference to FIG. 11.

Figure 8:
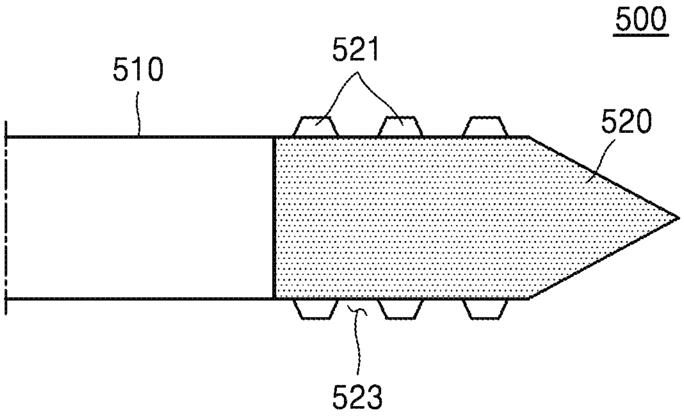
FIG. 8 is a view illustrating a first portion and a second portion of a heating element, according to another embodiment.

FIG. 8 is a view illustrating a first portion 510 and a second portion 520 of a heating element 500, according to another embodiment.

Unlike the above-described embodiments, the heating element 500 in the embodiment of FIG. 8 may have a needle shape. The heating element 500 may be arranged inside an accommodation space of an aerosol generating device. When an aerosol generating article is inserted into the accommodation space, the heating element 500 may be inserted into the aerosol generating article.

In detail, the heating element 500 may have an elongated shape arranged in the accommodation space. The heating element 500 may include the first portion 510 and the second portion 520 that are continuously arranged in a direction in which the heating element 500 having the elongated shape extends. In addition, the first portion 510 and the second portion 420 of the heating element 500 may have different surface structures.

Referring to FIG. 8, the second portion 520 may have an outer surface including a plurality of grooves 523 or a plurality of protrusions 521 that are spaced apart from each other. The outer surface of the second portion 520 may be processed, for example, by an anodizing method, a forging processing method, a die casting method, or a vacuum evaporation method. Based on which of the above processing methods is used, an outer surface structure of the second portion 520 may differ.

In one or more embodiments, one of the first portion 510 and the second portion 520 may have higher heat conductivity than the other. For example, when an aerosol generating article is inserted into an aerosol generating device, the first portion 510 may have higher heat conductivity than the second portion 520. Accordingly, different areas of the aerosol generating article may be heated at different temperatures.

Although not illustrated in FIGS. 6 through 8, a first portion of the heating element may also be processed to have a particular surface structure. For example, the first portion may be processed by an anodizing method to have a plurality of grooves, and the second portion may be processed by a forging processing method to have a plurality of protrusions. Surface structures of the first portion and the second portion may be different such that the first portion and the second portion may be heated at different temperatures.

A general combustion-type cigarette or a general heating-type cigarette may be inserted into an aerosol generating device according to one or more embodiments and heated. Also, an aerosol generating article that will be described later may be inserted into an aerosol generating device according to one or more embodiments and heated.

Figure 9:
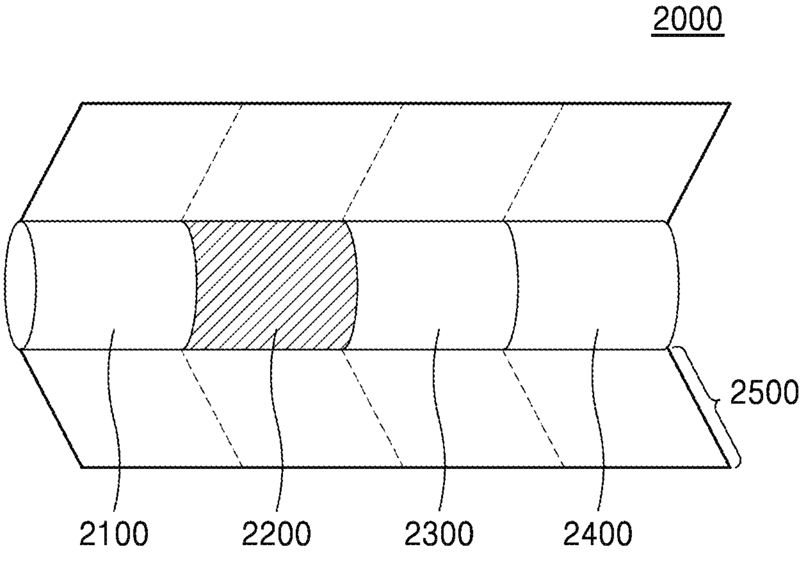
FIG. 9 is a view illustrating an aerosol generating article, according to an embodiment.

FIG. 9 is a view illustrating an aerosol generating article 2000 according to an embodiment.

According to one or more embodiments, the aerosol generating article 2000 may include a first area 2100, a second area 2200, a third area 2300, and a fourth area 2400 that are arranged in a longitudinal direction. As an example, the first area 2100 may include an aerosol generating material, the second area 2200 may include a tobacco material, the third area 2300 may cool an air flow passing through the first area 2100 and the second area 2200, and the fourth area 2400 may include a filter material.

In one or more embodiments, the first area 2100, the second area 2200, the third area 2300, and the fourth area 2400 may be sequentially arranged in a longitudinal direction of the aerosol generating article 2000. Therefore, aerosol generated in at least one of the first area 2100 and the second area 2200 may generate an air flow by sequentially passing through the first area 2100, the second area 2200, the third area 2300, and the fourth area 2400. As a result, a smoker may inhale the aerosol from the fourth area 2400.

In one or more embodiments, the first area 2100 may have a length of about 8 mm to about 12 mm, and the second area 2200 may have a length of about 10 mm to about 14 mm. However, the first area 2100 and the second area 2200 are not limited to such a numerical range, and the lengths of the first area 2100 and the second area 2200 may be appropriately adjusted as necessary.

In detail, the first area 2100 may include an aerosol generating material. Here, the aerosol generating material may include, for example, at least one of glycerin, propylene glycol, ethylene glycol, dipropylene glycol, diethylene glycol, triethylene glycol, tetraethylene glycol, and oleyl alcohol.

The second area 2200 may include a tobacco material. The tobacco material may be, for example, tobacco leaves, tobacco side veins, expanded tobacco, cut tobacco leaves, reconstituted tobacco sheets, reconstitute tobacco, or a combination thereof.

The third area 2300 may cool the air flow passing through the first area 2100 and the second area 2200. The third area 2300 may be made of a polymer material or a biodegradable polymer material and have a cooling function. For example, the third area 2300 may be made of a polylactic acid (PLA) fiber but is not limited thereto. In some embodiments, the third area 2300 may include a cellulose acetate filter having a plurality of holes. However, the material of the third area 2300 is not limited to the above-described example and may include all materials that may cool aerosol. For example, the third area 2300 may be a tube filter or a paper tube filter having a hollow.

The fourth area 2400 may include a filter material. For example, the fourth area 2400 may be a cellulose acetate filter. A shape of the fourth area 2400 is not limited. For example, the fourth area 2400 may be a cylinder-type rod or a tube-type rod having a hollow inside. As another example, the fourth area 2400 may be a recess-type rod. The fourth area 2400 may include a plurality of segments, and at least one of the plurality of segments may have a different shape.

The fourth area 2400 may be formed to generate flavors. As an example, a flavoring liquid may be injected onto the fourth area 2400, or an additional fiber coated with a flavoring liquid may be inserted into the fourth area 2400.

The aerosol generating article 2000 may include a wrapper 2500 that partially or fully surrounds the first area 2100 through the fourth area 2400. The wrapper 2500 may be located at the outermost portion of the aerosol generating article 2000. The wrapper 2500 may have at least one hole through which external air may be introduced or internal air may be discharged. The wrapper 2500 may be a single wrapper or a combination of a plurality of wrappers.

As an example, the first area 2100 of the aerosol generating article 2000 may include a crimped wrinkled sheet including an aerosol generating material, and the second area 2200 may include a tobacco material such as reconstituted tobacco sheets. The third area 2300 may include polylactide acid (PLA) fiber, and the fourth area 2400 may include a cellulose acetate (CA) fiber, but the present disclosure is not limited thereto.

In one or more embodiments, when the aerosol generating article 2000 illustrated in FIG. 9 is inserted into the aerosol generating device 100 illustrated in FIG. 5, the first portion 141 of the heating element 140 may surround the first area 2100 of the aerosol generating article 2000, and the second portion 142 of the heating element 140 may surround the second area 2200 of the aerosol generating article 2000. When the aerosol generating device 100 operates, for example, the first portion 141 may heat the first area 2100 at a temperature of about 200° C. to about 300° C., and the second portion 143 may heat the second area 2200 at a temperature of about 100° C. to about 180° C. Therefore, an aerosol generating material and a tobacco material may be respectively heated at appropriate temperatures, and a smoker may be provided with a better smoking sensation by inhaling the aerosol.

An aerosol generating system according to an embodiment may include the aerosol generating device 100 and the aerosol generating article 2000 including both the first area 2100 including an aerosol generating material and the second area 2200 including a tobacco material. The first portion 141 may heat the first area 2100, and the second portion 143 may heat the second area 2200.

The descriptions of the above-described embodiment may be analogously applied to the present embodiment.

As described above, the first area 2100 may be heated at a temperature of about 200° C. to about 300° C., and the second area 2200 may be heated at a temperature of about 100° C. to about 180° C. Respective areas of the aerosol generating article 2000 may be heated at different temperatures, and thus, a smoker may feel the rich flavor of the aerosol generating article 2000 and may be provided with a better smoking sensation.

Figure 10A:
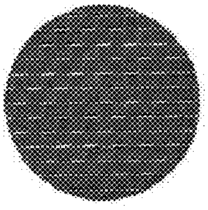
FIG. 10A through 10J are views illustrating surfaces of a heating element, according to some embodiments.
Figure 10B:
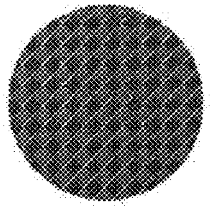
Figure 10C:
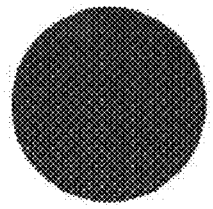
Figure 10D:
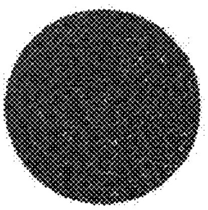
Figure 10E:
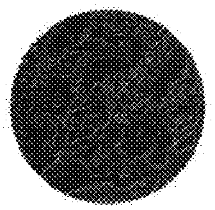
Figure 10F:
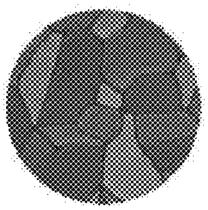
Figure 10G:
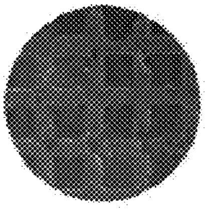
Figure 10H:
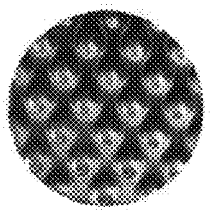
Figure 10I:
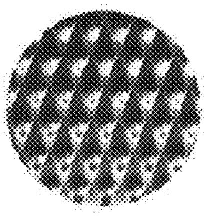
Figure 10J:
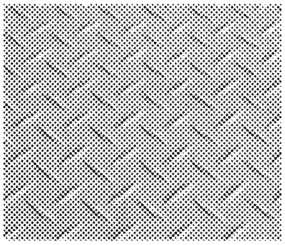

FIGS. 10A through 10J are views illustrating surfaces of a heating element according to various embodiments. For example, an inner surface and/or an outer surface of a second portion of a heating element may have one of the surface structures illustrated in FIGS. 10A through 10J. The inner surface and/or the outer surface of the second portion of the heating element may include grooves or protrusions that are regularly arranged as illustrated in FIG. 10A, FIG. 10B, FIG. 10C, FIG. 10G, FIG. 10H, FIG. 10I, or FIG. 10J. Also, the inner surface and/or the outer surface of the second portion of the heating element may include grooves or protrusions that are irregularly arranged as illustrated in FIG. 10D, FIG. 10E, or FIG. 10F. However, the present disclosure is not limited to the above-described surface structures and may differ according to embodiments.

Each of the first portion and the second portion of the heating element may have one of inner surfaces illustrated in FIGS. 10A through 10J. For example, the first portion may have an inner surface as illustrated in FIG. 10A, and the second portion may have an inner surface as illustrated in FIG. 10B. However, the embodiments not limited to the above-described example and, the inner surface structures of the first portion and the second portion may have any combination of inner surfaces illustrated in FIGS. 10A through 10J.

Figure 11:
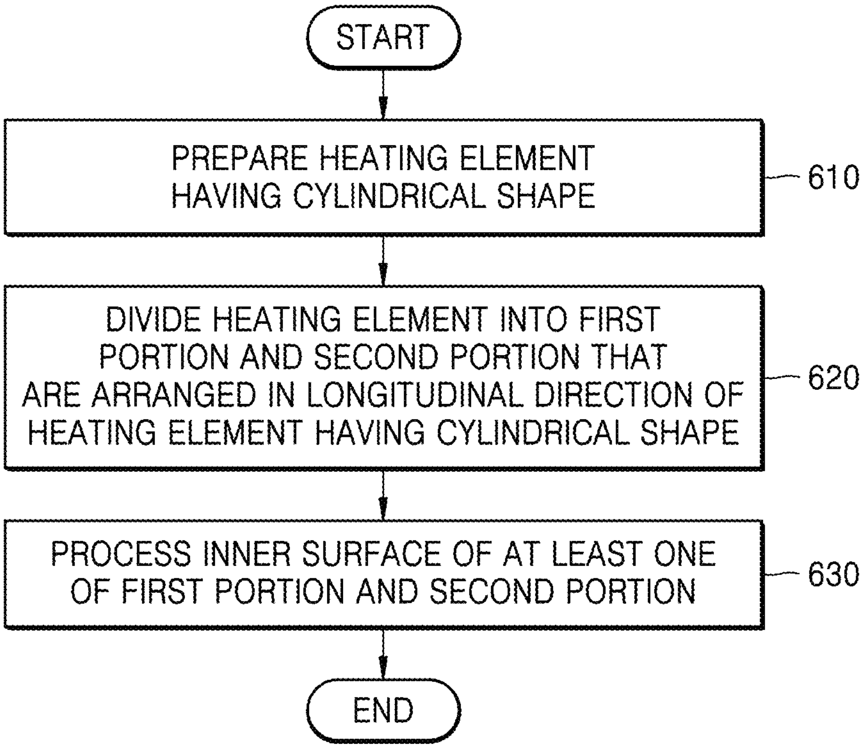
FIG. 11 is a flowchart illustrating a method of processing a heating element, according to some embodiments.

FIG. 11 is a flowchart illustrating a method of processing a heating element, according to one or more embodiments.

One or more embodiments may include a method of processing a heating element for an aerosol generating device, the method including: operation 610 of preparing the heating element having a cylindrical shape; operation 620 of dividing the heating element into a first portion and a second portion that are continuously arranged in a longitudinal direction of the heating element having the cylindrical shape; and operation 630 of processing an inner surface of at least one of the first portion and the second portion.

The descriptions of the above-described embodiments may be analogously applied to the present embodiment.

In one or more embodiments, the method of processing the heating element for the aerosol generating device may include operation 610 of preparing the heating element having the cylindrical shape.

Also, the method of processing the heating element for the aerosol generating device may include operation 620 of dividing the heating element into the first portion and the second portion that are continuously arranged in the longitudinal direction of the heating element having the cylindrical shape. In detail, the heating element having the cylindrical shape may include the first portion and the second portion. The first portion and the second portion may be continuously arranged in the longitudinal direction of the heating element having the cylindrical shape. Also, referring to FIG. 6 again, the heating element 200 may be divided into the first portion 210 and the second portion 220. Before operation 630 of processing the inner surface, the first portion 210 and the second portion 220 may have smooth inner surfaces and outer surfaces.

In one or more embodiments, the method of processing the heating element for the aerosol generating device may include operation 630 of processing the inner surface of at least one of the first portion and the second portion. Operation 630 of processing the inner surface may include operation of forming a plurality of grooves by oxidizing the inner surface or operation of forming a plurality of protrusions by depositing particles on the inner surface. For example, as described above, operation 630 of processing the inner surface may include operation of processing the inner surface by an anodizing method, a forging processing method, a die casting method, or a vacuum evaporation method.

According to the anodizing method, for example, the inner surface of the second portion may be oxidized. When the second portion is formed of an aluminum (Al) material before being processed, the second portion may be formed of an aluminum oxide ($Al_2O_3$) material after being processed by the anodizing method. As in the example illustrated in FIG. 7A, the inner surface 310 that is oxidized may include the plurality of grooves 311. Processing by the anodizing method may be performed within a temperature range lower than or equal to about 120° C.

According to the forging processing method, for example, the inner surface of the second portion may be physically transformed. The outer appearance of the second portion may be transformed by an external force such that a plurality of grooves or protrusions that are formed by a tapping or pressing method. As in the example illustrated in FIG. 7B, the inner surface 410 that is transformed may include the plurality of protrusions 411.

According to the die casting method, for example, the inner surface of at least one of the first portion and the second portion may be manufactured to have a plurality of grooves or protrusions. Once a corresponding mold corresponding to a heating element having a desired shape is manufactured, a heating element having a desired shape may be manufactured by injecting molten metal into the mold and cooling the injected metal.

According to the vacuum evaporation method, a plurality of protrusions may be formed on the inner surface of at least one of the first portion and the second portion. For example, the vacuum evaporation method may include sputtering, physical vapor deposition (PVD), chemical vapor deposition (CVD), or atomic layer deposition (ALD). For example, when the vacuum evaporation method is used, deposition may be performed with respect to the first portion or the second portion at an operation temperature of about 800° C.

When the vacuum evaporation method is used, a surface shape or a surface color of at least one of the first portion and the second portion may differ according to a deposited material. For example, the entire heating element may be formed of stainless steel, titanium carbide (TiC) may be deposited on the surface of the first portion, and titanium nitride (TiN) may be deposited on the surface of the second portion. In this case, the first portion and the second portion may have different surface structures and thus may be heated at different temperatures.

Also, in the above-described example, the surface of the first portion may be black, and the surface of the second portion may be yellow. Therefore, radiant heat received by the first portion is greater than radiant heat received by the second portion, and the first portion may be heated at a higher temperature than the second portion. However, the present disclosure is not limited to the above-described example and various types of heating elements that may be manufactured by processing the first portion and the second portion by various combinations of the above-described methods.

FIGS. 12A through 12H are views illustrating respective surfaces of a heating element according to various embodiments.

Figure 12A:
FIGS. 12A through 12H are views illustrating respective surfaces of a heating element, according to some embodiments.
Figure 12B:
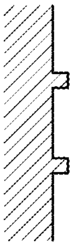
Figure 12C:
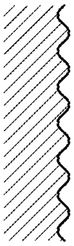
Figure 12D:
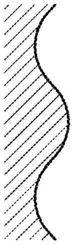
Figure 12E:
Figure 12F:
Figure 12G:
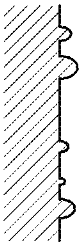
Figure 12H:
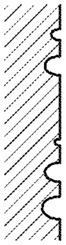

Each of a first portion and a second portion of a heating element may have an inner surface corresponding to one of inner surfaces illustrated in FIGS. 12A through 12H. Therefore, the first portion and the second portion of the heating element may have an inner surface structure according to any combination of the inner surfaces illustrated FIG. 12A through FIG. 12H. For example, the first portion may have a streamlined flexure as illustrated in FIG. 12C, and the second portion may have an inner surface having a shape as illustrated in FIG. 12E.

The first portion and the second portion may have different inner surface areas.

Also, the first portion and the second portion may have the same thermal mass. Here, "the thermal mass" is obtained by multiplying the mass (i.e., weight) of an object by the heat capacity of the object.

For example, if the first portion and the second portion have an inner surface of the same material and weight, the first portion and the second portion have the same thermal mass.

Figure 13:
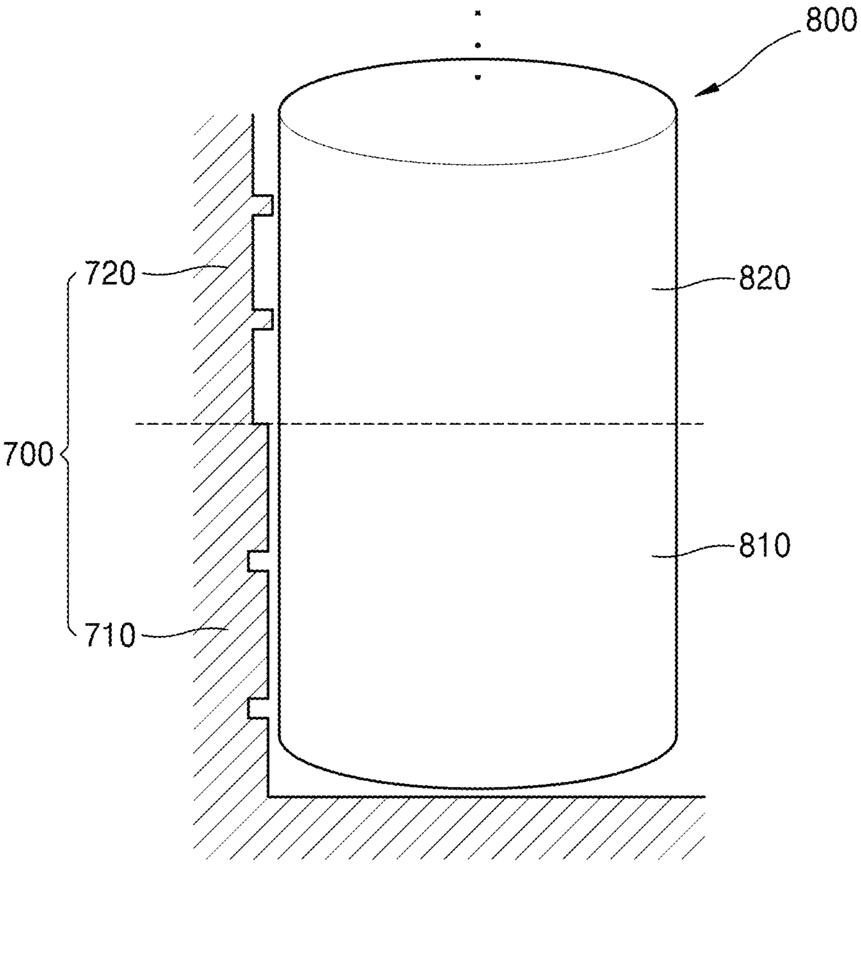
FIG. 13 is a view illustrating an aerosol generating article and a heating element contacting each other, according to an embodiment.

FIG. 13 is a view illustrating an aerosol generating article 800 and a heating element 700 contacting each other, according to an embodiment.

The aerosol generating article 800 may include a first area 810 and a second area 820. The first area 810 and the second area 820 may include materials having different components and weights.

Referring to FIG. 13, the heating element 700 may include a first portion 710 and a second portion 720 having different inner surfaces. The first portion 710 may have the inner surface illustrated in FIG. 12A, and the second portion 720 may have the inner surface illustrated in FIG. 12B.

According to an embodiment, the first portion 710 and the second portion 720 may be designed to have the same thermal mass.

Also, the first portion 710 may be engraved to have a plurality of grooves, and the second portion 720 may be embossed to have a plurality of protrusions.

The first portion 710 may be arranged to cover the first area 810, and the second portion 720 may be arranged to cover the second area 820. However, the size of a contacting area between the first portion 710 and the first area 810 may be different from the size of the contacting area between the second portion 720 and the second area 820. Therefore, an amount of heat transferred by the first portion 710 to the first area 810 may be different from an amount of heat transferred by the second portion 720 to the second area 820.

For example, the amount of heat transferred by the first portion 710 to the first area 810 may be greater than the amount of heat transferred by the second portion 720 to the second area 820. In this case, the first area 810 may be heated at a higher temperature than the second area 820.

At least one of the components, elements, modules or units (collectively "components" in this paragraph) represented by a block in the drawings such as the controller 12000 in FIGS. 1-4, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:

a housing having an open end;

a battery arranged at another end of the housing and configured to supply power;

an accommodation space arranged at the open end of the housing and configured to accommodate an aerosol generating article; and a heating element configured to heat the aerosol generating article and including a first portion and a second portion continuously arranged in a longitudinal direction of the aerosol generating article, wherein the first portion and the second portion have different surface structures, and wherein one of the first portion and the second portion of the heating element has an inner surface including a plurality of grooves formed by oxidizing.

2. The aerosol generating device of claim 1, wherein the heating element has a cylindrical shape and is arranged to surround the accommodation space such that the first portion and the second portion are continuously arranged in the longitudinal direction of the heating element.

3. The aerosol generating device of claim 1, wherein the heating element has an elongated shape and is arranged inside the accommodation space such that the first portion and the second portion are continuously arranged in the longitudinal direction of the elongated shape.

4. The aerosol generating device of claim 2, wherein one of the first portion and the second portion of the heating element, in which the plurality of grooves are not formed, has an inner surface including a plurality of protrusions formed by a vacuum evaporation method.

5. The aerosol generating device of claim 4, wherein the plurality of grooves have a depth of about 0.1 μm to about 100 μm, or the plurality of protrusions have a height of about 0.1 μm to about 100 μm.

6. A method of processing a heating element for an aerosol generating device, the method comprising:

dividing a heating element having a cylindrical shape into a first portion and a second portion such that the first portion and the second portion are continuously arranged in a longitudinal direction of the cylindrical shape; and processing an inner surface of at least one of the first portion and the second portion such that inner surfaces of the first portion and the second portion have different structures, wherein the processing of the inner surface of the at least one of the first portion and the second portion includes forming a plurality of grooves by oxidizing the inner surface of one of the first portion and the second portion.

7. The method of claim 6, wherein the processing of the inner surface of the at least one of the first portion and the second portion includes forming a plurality of protrusions by depositing particles by a vacuum evaporation method on the inner surface of one of the first portion and the second portion in which the plurality of grooves are not formed.

8. An aerosol generating device comprising:

a housing having an open end;

a battery arranged at another end of the housing and configured to supply power;

an accommodation space arranged at the open end of the housing and configured to accommodate an aerosol generating article; and a heating element configured to heat the aerosol generating article and including a first portion and a second portion continuously arranged in a longitudinal direction of the aerosol generating article, wherein the first portion and the second portion have different inner surface areas, and wherein one of the first portion and the second portion of the heating element has an inner surface including a plurality of grooves formed by oxidizing.

9. The aerosol generating device of claim 8, wherein the first portion and the second portion have a same thermal mass.

10. The aerosol generating device of claim 8, wherein the first portion has grooves, and the second portion has protrusions.

11. The aerosol generating device of claim 8, wherein at least one of the first portion and the second portion is embossed, and the other of the first portion and the second portion is engraved.

12. The aerosol generating device of claim 8, wherein at least one of the first portion and the second portion has a streamlined flexure.

13. The aerosol generating device of claim 8, wherein the aerosol generating article includes a first area corresponding to the first portion; and a second area corresponding to the second portion, and an amount of heat transferred by the first portion to the first area is different from an amount of heat transferred by the second portion to the second area.

14. The aerosol generating device of claim 8, wherein the aerosol generating article includes a first area corresponding to the first portion; and a second area corresponding to the second portion, and wherein an amount of heat transferred by the first portion to the first area is greater than an amount of heat transferred by the second portion to the second area.

* * * * *